Jan. 16, 1940.  A. ILLSCHE  2,187,605
FASTENER FOR WOMEN'S HANDBAGS AND OTHER ARTICLES
Filed Dec. 31, 1938  2 Sheets-Sheet 1

INVENTOR
Arthur Illsche
BY
Walter H. Humphrey
ATTORNEYS

Jan. 16, 1940.   A. ILLSCHE   2,187,605
FASTENER FOR WOMEN'S HANDBAGS AND OTHER ARTICLES
Filed Dec. 31, 1938   2 Sheets-Sheet 2
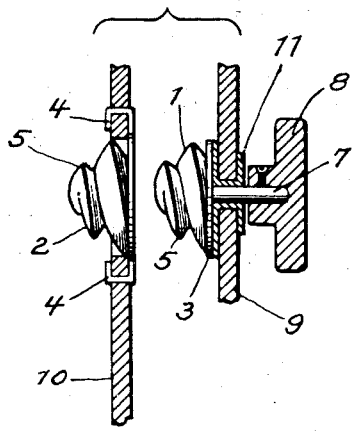
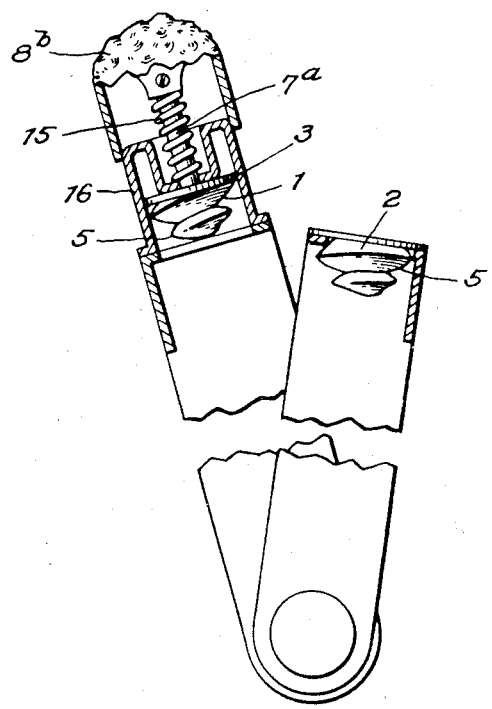
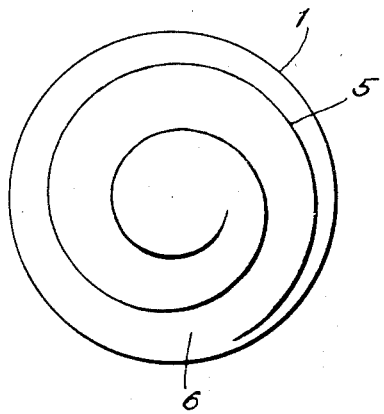

Patented Jan. 16, 1940

2,187,605

UNITED STATES PATENT OFFICE 2,187,605

FASTENER FOR WOMEN'S HANDBAGS AND OTHER ARTICLES

Arthur Illsche, Rye, N. Y.

Application December 31, 1938, Serial No. 248,817

7 Claims. (Cl. 292—251)

The present invention, while applicable to serve various purposes and not limited to any particular or special use, is herein embodied, for convenience of illustrating a practical application, as a closure fastening for women's hand-bags of well known types.

Spring catches of various kinds, including snap fasteners, are extensively employed to hold such bags closed but are unsatisfactory and objectionable for a number of reasons, prominent among which may be mentioned first, weakening of the spring action of the catches and resulting insecurity of the fastening; and second, damage to the bag flap, resulting from its use as a convenient gripping means to force snap fasteners into engagement and "tear" them apart.

My improved fastening avoids the above mentioned and other objections in operating effectively without the aid of spring action, being non-resilient throughout and consisting of twin members, provided with specially formed screw-threads, by which engagement and disengagement is greatly simplified and made possible by rotation through less than a complete revolution.

As mounted for use, the fastener members are self-centering and enterable one into the other in nested relation, preparatory to being interlocked. The operation of locking or unlocking the members is accomplished in a simple and easy manner and without effort, by giving one of the members about a half turn, which results in either full and secure engagement or complete disengagement, depending upon whether the member is turned towards the right or left.

The form given the members and the thread thereon, is such that they freely enter one within the other to nearly their full depth, preparatory to interlocking and being thus closely associated, a half turn of either member serves to fully engage the threads.

In outline, the members are of frustro-conical form, the length or height being preferably less than the base diameter, with the thread extending from the base to the top. The above proportions give the members great strength and by the use of a special form of ratchet thread, quick engagement and disengagement follows upon giving either member a slight turn.

The ratchet-thread, with a broad face and a narrow face, tapers throughout its length. Starting at the base of the frustro-conical member, with its broad face equalling approximately one-quarter the base diameter of the cone, the thread spirals upward, reaching the top in about a turn and a half and gradually tapering to zero dimensions.

While the members may be produced in more or less solid form, it avoids unnecessary weight and gives them increased strength and durability, when constructed in shell form from sheet metal and makes conveniently available integral material at the larger end, for use in mounting or securing the members in position for use.

The detail structure and application of the device as a closure fastening for women's handbags, is illustrated in the accompanying drawings throughout the several views of which, like reference characters indicate like parts.

In the drawings—

Fig. 4 is a cross sectional view, on an enlarged scale, through the upper portion of the bag and centrally of the fastener, showing the bag open and the fastener members disengaged. This view illustrates the form and mounting of the fastener as applied to the bags shown in Figs. 1 and 2.

Fig. 5 is a similar view of the modified form and mounting of the fastener shown in Fig. 3.

Fig. 6 is a top plan view, on an enlarged scale, of one of the fastener members, and Fig. 7 is a view in side elevation thereof.

Figure 1:
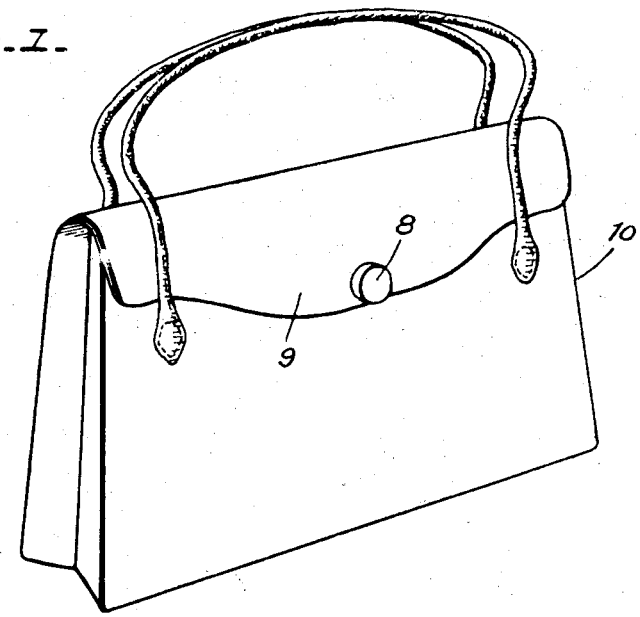
Fig. 1 is a perspective view showing the fastener applied to a woman's hand-bag, in which a flap extension of the body material serves as a closure for the bag.

Referring now to the drawings, the fastener consists of two members, a male member 1 and a female member 2, the engaging portions of which are of frustro-conical form and practically identical and interchangeable, one being the counter-part of the other.

These frustro-conical engaging portions, as shown, are in shell form and in being shaped up from sheet metal, integral material at the larger end of the cone becomes available for various uses, such, for example, as a bearing 3 for the male member and attaching spurs 4 for the female member. (See Fig. 4.)

The frustro-conical portions of the members are preferably given a length or height approximately equal to half the base diameter of the cone. Thus proportioned, they are strong and lasting, they nest quickly, one within the other, to almost their full depth, and their interlocking engagement, one with the other, as hereinafter described, is greatly simplified and facilitated.

Spiralling upward from the base to the top of the cone, there is a ratchet-thread formation 5 of approximately a turn and a half. The width of the broad face 6 of the thread, at the base of the cone, is about equal to one-quarter the base diameter and tapers upward to zero dimensions at the top.

This coarse tapering ratchet thread, spiralling upward a turn and a half or so, with a gradually reducing radius, when in nesting relation with its counter-part, will enter into full interlocked engagement therewith upon being given a slight turn of about half a revolution.

While rotation of either member would serve to bring about engagement or disengagement, I preferably provide for rotatably mounting the male member and non-rotatably securing the female member in cooperating relation.

Projecting from the base of the frustro-conical portion of the male member, there is a fixed center pin or stud shaft 7, which is fitted to turn in a suitable bearing, as hereinafter described, and has a knob 8, plain or ornamented, and of suitable shape removably attached to its outer end, by means of which the male member is rotated.

Figure 2:
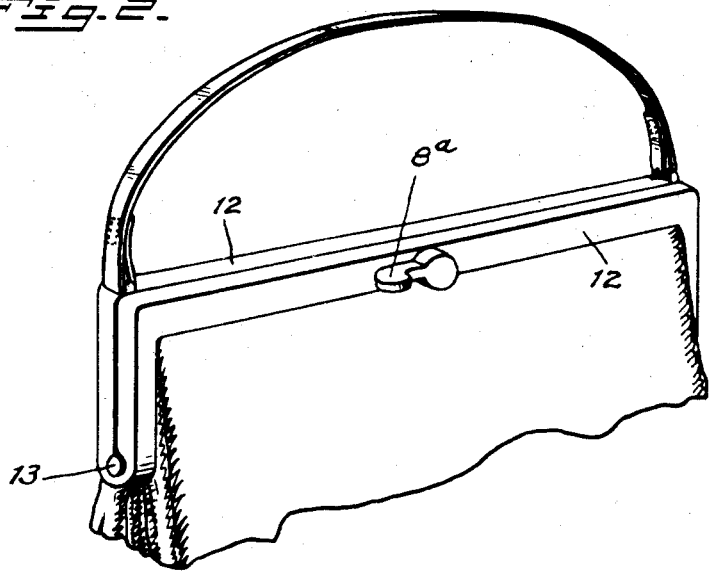
Fig. 2 is a similar view showing the application of the fastener to a different type of bag, in which a two-part metal frame with the parts hinge-connected and closing against each other, is secured to the mouth of the bag as a closure for the same.
Figure 3:
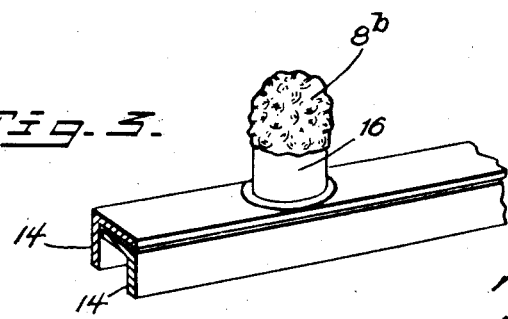
Fig. 3 is a similar showing of another type of hinged metal frame, in which the frame parts close in overlapping relation and the fastener mounting is modified to permit opening and closing of the overlapping parts.

The use of the above described device as a closure fastening for women's hand-bags, is illustrated in Figs. 1, 2 and 3, in which several bags, of types now in common use, are shown.

In Fig. 1, an extension flap 9 of the body 10, serves as a closure for the bag and is ordinarily reinforced or otherwise stiffened to cause it to have practically the same action, in closing, as if it were hinged to the bag body. That is to say, it is self-positioning in closing to bring the fastening members employed to secure it, into proper relation for engagement.

In applying my fastener to a bag of this type, the male member 1 is rotatably mounted in a metal eyelet or grummet 11 of the flap 9 and the female member 2 is non-rotatably secured by its attaching spurs in an opening in the body of the bag the flap overlaps, when closed. The above described self-positioning action of the flap in closing, serves, in the use of my fastener, to bring the members 1 and 2 thereof into centered nested relation, preparatory to interlocking and simplifies and reduces the interlocking operation to merely giving the member 1 about a half turn, as previously pointed out.

In applying the fastener to the metal frame elements 12, 12, of the bag shown in Fig. 2, in which the frame elements are hinged together at 13, and close one against the other, a fastener member is mounted on each frame element so that as the frame elements are brought together to close the bag, one fastener member will enter in centered nested relation within the other, preparatory to interlocking, in precisely the same manner as described in reference to operation of the fastener applied to the bag shown in Figs. 1 and 4. The interlocking of the fastener members is then effected, again as in Figs. 1 and 4, by giving the male fastener member a partial turn. For convenience in turning the member, a short lever 8ª, plain or ornamental, is substituted for the knob shown in Fig. 1, otherwise the fasteners in Figs. 1 and 2 are identical.

Where structural elements come into overlapping relation, as, for example, the metal frame elements 14, 14 of the bag shown in Figs. 3 and 5, provision is made for withdrawing the male fastener member by the action of a spring 15, encircling its shaft 7ª, into a cylindrical casing 16, to provide clearance for the opening and closing of the overlapping frame elements. To engage the fastener members in this form of the mounting, the knob or cap 8ᵇ of the male member, which is shown telescoping on the cylindrical casing 16, must be pressed downward, against the action of the spring, and given a partial turn.

It will be noted that when engaged, there is no tendency of the fastener members to become disengaged and security is thus insured against accidental opening of the bag and loss of the contents. Another feature that specially adapts the device for use on women's hand-bags, is that it is small and entirely concealed from view, excepting only the ornamental knob or the like, for turning the male member.

Having described my invention, I claim:

1. A two-member fastener, the engaging portions of the members being tapered and terminating in a blunt end, the said tapered portions being proportioned to freely enter one into the other in self-centering nested relation without interlocking, cooperating screw-threads on the members of such form that relative rotation through a partial revolution will cause full interlocking engagement of the nested members, and a two-part mounting for the fastener members, the two parts of the mounting being relatively movable to position the fastener members for interlocking engagement.

2. A two-member fastener, the engaging portions of the members being tapered and terminating in a blunt point, the said tapered portions being proportioned to freely enter one into the other in self-centering nested relation without interlocking, cooperating screw-threads on the members of such form that relative rotation through a partial revolution will cause full interlocking engagement of the nested members, and a two-part mounting for the fastener members, one part having one fastener member rotatably mounted thereon and the other part having the other fastener member non-rotatably secured thereto, the two parts of the mounting being relatively movable to position the fastener members for interlocking engagement.

3. A two-member fastener for hand-bags and other articles, the engaging portions of the members being of tapered form flattened at the smaller end and of a length less than the base diameter, such engaging portions being proportioned to freely enter, one within the other in self-centering nested relation before interlocking, and cooperating screw-threads on the tapered portion of the members engageable by relative rotation of the nested members, the said cooperating screw-threads each consisting of a spiral formation of less than two turns with one face of the thread increasing in width throughout its length to a breadth at the base of the tapered portion of the member of approximately one-quarter the base diameter.

4. A two-member fastener for hand-bags and other articles, the engaging portions of the members being of tapered form flattened at the smaller end and of a length less than the base diameter, such engaging portions being proportioned to freely enter, one within the other in self-centering nested relation before interlocking, and cooperating screw-threads on the tapered portion of the members engageable by relative rotation of the nested members, the said cooperating screw-threads each consisting of a spiral formation of less than two turns with one face of the thread narrow throughout its length and the other face increasing in width to a breadth at the base of the tapered portion of the member of approximately one-quarter the base diameter.

5. A fastener member provided with a tapered portion terminating in a blunt end and having a spiral thread formation thereon extending throughout the tapered portion of the member, the length of the said tapered portion being approximately half the diameter of the base thereof and the spiral thread thereon approximately one and one-half turns in length, the formation being such that full and complete engagement with the thread of a counter-part member is effected on rotation through less than a complete revolution.

6. A fastener member provided with a tapered portion of a length less than the base diameter and terminating in a blunt end and a spiral thread formation thereon extending throughout the tapered portion of the member, the spiral thread being developed from zero dimensions at the smaller end of the tapered portion of the member and gradually enlarged throughout its length to a face width at the larger end of approximately a quarter the diameter of the larger end, the formation being such that full and complete engagement with the thread of a counter-part member is effected on rotation through less than a complete revolution.

7. A two-member fastener as defined in claim 3, in which the fastener members are twin truncated cones of shell form integrally extended at their larger ends to provide bearing and attaching elements.

ARTHUR ILLSCHE.